US008040581B2

(12) United States Patent
Tezuka

(10) Patent No.: US 8,040,581 B2
(45) Date of Patent: Oct. 18, 2011

(54) METHOD FOR CALIBRATING COLOR IMAGE FORMING APPARATUS

(75) Inventor: Hiroki Tezuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1164 days.

(21) Appl. No.: 11/187,808

(22) Filed: Jul. 25, 2005

(65) Prior Publication Data

US 2006/0023272 A1    Feb. 2, 2006

(30) Foreign Application Priority Data

Jul. 28, 2004 (JP) ................................ 2004-219971

(51) Int. Cl.
G03F 3/08 (2006.01)

(52) U.S. Cl. ............ 358/518; 358/504; 347/19; 399/39; 399/49; 382/167

(58) Field of Classification Search .............. 358/1.9, 358/1.15, 501; 347/19; 399/39, 49; 235/454
See application file for complete search history.

(56) References Cited

U.S. PATENT DOCUMENTS

| | | | | |
|---|---|---|---|---|
| 5,557,430 A * | 9/1996 | Isemura et al. | ............... | 358/501 |
| 5,963,756 A * | 10/1999 | Sakai et al. | ............... | 399/39 |
| 6,480,299 B1 * | 11/2002 | Drakopoulos et al. | ......... | 358/1.9 |
| 6,853,815 B2 * | 2/2005 | Tezuka et al. | ................... | 399/39 |
| 6,898,381 B2 * | 5/2005 | Maebashi et al. | ............... | 399/49 |
| 7,025,266 B2 * | 4/2006 | Keithley | ....................... | 235/454 |
| 7,097,270 B2 * | 8/2006 | Yamazaki | ........................ | 347/19 |
| 7,139,087 B2 * | 11/2006 | Hayashi | ....................... | 358/1.15 |
| 7,486,414 B2 * | 2/2009 | Arai | ................................ | 358/1.9 |
| 2002/0054237 A1 | 5/2002 | Nichogi | | |
| 2003/0049040 A1 * | 3/2003 | Tezuka et al. | ................... | 399/49 |
| 2003/0063338 A1 * | 4/2003 | Gudaitis et al. | ................ | 358/1.9 |
| 2003/0085941 A1 * | 5/2003 | Tezuka et al. | ................... | 347/19 |
| 2003/0090693 A1 * | 5/2003 | Tezuka et al. | ................... | 358/1.9 |
| 2004/0028421 A1 * | 2/2004 | Shiratori | ......................... | 399/49 |
| 2004/0131371 A1 * | 7/2004 | Itagaki et al. | ................... | 399/49 |
| 2004/0136015 A1 * | 7/2004 | Van de Capelle et al. | ..... | 358/1.9 |
| 2005/0248789 A1 | 11/2005 | Kita et al. | ...................... | 358/1.9 |
| 2005/0260003 A1 | 11/2005 | Tezuka | ........................... | 399/15 |
| 2006/0023272 A1 | 2/2006 | Tezuka | ........................... | 358/518 |

FOREIGN PATENT DOCUMENTS

| | | |
|---|---|---|
| JP | 2002-033933 | 1/2002 |
| JP | 2003-084532 | 3/2003 |
| JP | 2003169219 A * | 6/2003 |

* cited by examiner

*Primary Examiner* — Twyler Haskins
*Assistant Examiner* — Nicholas Pachol
(74) *Attorney, Agent, or Firm* — Fitzpatrick, Cella, Harper & Scinto

(57) ABSTRACT

A calibration method for calibrating a color image forming apparatus includes detecting the color of a patch formed on a recording medium by the color image forming apparatus using a color sensor, converting a detected color signal in a first color specification system into a color signal in a second color specification system, and adjusting at least one of the image forming conditions for the color image forming apparatus, based on the color signal converted in the conversion step, where the conversion conditions in the color signal conversion are different depending on the attributes of the patch.

6 Claims, 8 Drawing Sheets

METHOD FOR CALIBRATING COLOR IMAGE FORMING APPARATUS

BACKGROUND OF THE INVENTION

1. Field of the Invention

The present invention relates to a method for calibrating a color image forming apparatus such as a color printer or a color copier, and more particularly to a color signal conversion method for measuring a test chart outputted to improve the color stability of a color image forming apparatus using a chromaticity detecting means, and converting a color signal in a first color specification system that is the detection result of the chromaticity detecting means into a color signal in a second color specification system.

2. Background of the Related Art

Recently, there has been increasing demand for a color image forming apparatus of the electrophotography type or the inkjet type, such as a color printer or a color copier, having high color stability of its output image.

Thus, the color image forming apparatus having a sensor for detecting the chromaticity of a patch on the recording medium after the forming and fixing of a monochromatic gradation patch of cyan (C), magenta (M), yellow (Y) or black (K) or a mixed color patch in which CMY are mixed on the recording medium (hereafter referred to as a color sensor) is well known (e.g., refer to U.S. Patent Application Publication No. 2003/049040).

In this color image forming apparatus, the color stability of a final output image formed on the recording medium is controlled by feeding back the detected result to a calibration table for correcting the exposure amount, the process conditions and the color gradation characteristics of an image forming portion. Also, the output image of the color image forming apparatus may be detected by an external image reading apparatus or a chromaticity meter to make the same control.

This color sensor uses a light emitting element having three or more kinds of light sources with different emission spectra of red (R), green (G) and blue (B), respectively, and a light receiving element with sensitivity in the visible region, or a light emitting element having a light source that emits light of white color (W) and a light receiving element formed with three or more filters of different spectral transmittances. Thereby, three or more kinds of outputs such as the RGB outputs are obtained.

In the color image forming apparatus of the ink jet type, since the color balance changes depending on a change in the ink discharge amount with the lapse of time, an environmental difference from one place or time of use to another, or the individual differences among ink cartridges, the color gradation characteristics cannot be kept constant. Thus, some color image forming apparatuses effect color stabilization control by substituting a color sensor for the ink head and detecting the chromaticity of a patch on the recording medium.

In the above color stabilization control, there is a process of converting the sensor outputs, which are RGB values, into XYZ chromaticity values as defined by the International Commission on Illumination (CIE). For this conversion, the prior art has used a method employing a matrix, as well as a method using a look-up table.

However, the above prior art had the following problems.

Generally, the color matching functions for the spectral sensitivity of RGB outputs of the color sensor and the XYZ chromaticity values as defined by the International Commission on Illumination do not have completely linear relations. Therefore, there is a problem that some differences may occur between the XYZ chromaticity values obtained by converting the RGB outputs of the sensor and the XYZ chromaticity values obtained from the spectral reflectance as defined by the International Commission on Illumination.

That is, the XYZ chromaticity values calculated from the RGB output signals of the sensor for a certain patch and the XYZ chromacity values calculated from the spectral reflectance for the patch as defined by the International Commission on Illumination may be different in some cases. And this difference between the chromaticity values may vary in magnitude, depending on the color material or substratum color of the patch used in forming the patch.

SUMMARY OF THE INVENTION

This invention has been achieved in the light of the above-mentioned problems, and it is an object of the invention to provide a color signal conversion method for reducing the differences occurring between the XYZ chromaticity values obtained by converting the RGB outputs of the sensor and the XYZ chromaticity values obtained from the spectral reflectance as defined by the International Commission on Illumination in a simple manner when measuring a test chart outputted by the color image forming apparatus.

In order to accomplish the above object, the invention provides a color image calibration method as defined in the claims.

With this invention, it is possible to reduce the differences occurring between the XYZ chromaticity values obtained by converting the RGB outputs of the sensor and the XYZ chromaticity values obtained from the spectral reflectance as defined by the International Commission on Illumination by changing various kinds of parameters used in converting the RGB outputs of the sensor into the XYZ chromaticity values depending on the attribute of patch. And the precision of color stability control using the XYZ chromaticity values can be improved.

Other objects, constitutions and effects of the invention will be apparent from the following detailed description of the invention and the drawings.

DETAILED DESCRIPTION OF THE PREFERRED EMBODIMENTS

The best mode for carrying out the present invention will be described below in detail with reference to the accompanying drawings.

Embodiment 1

Figure 2:
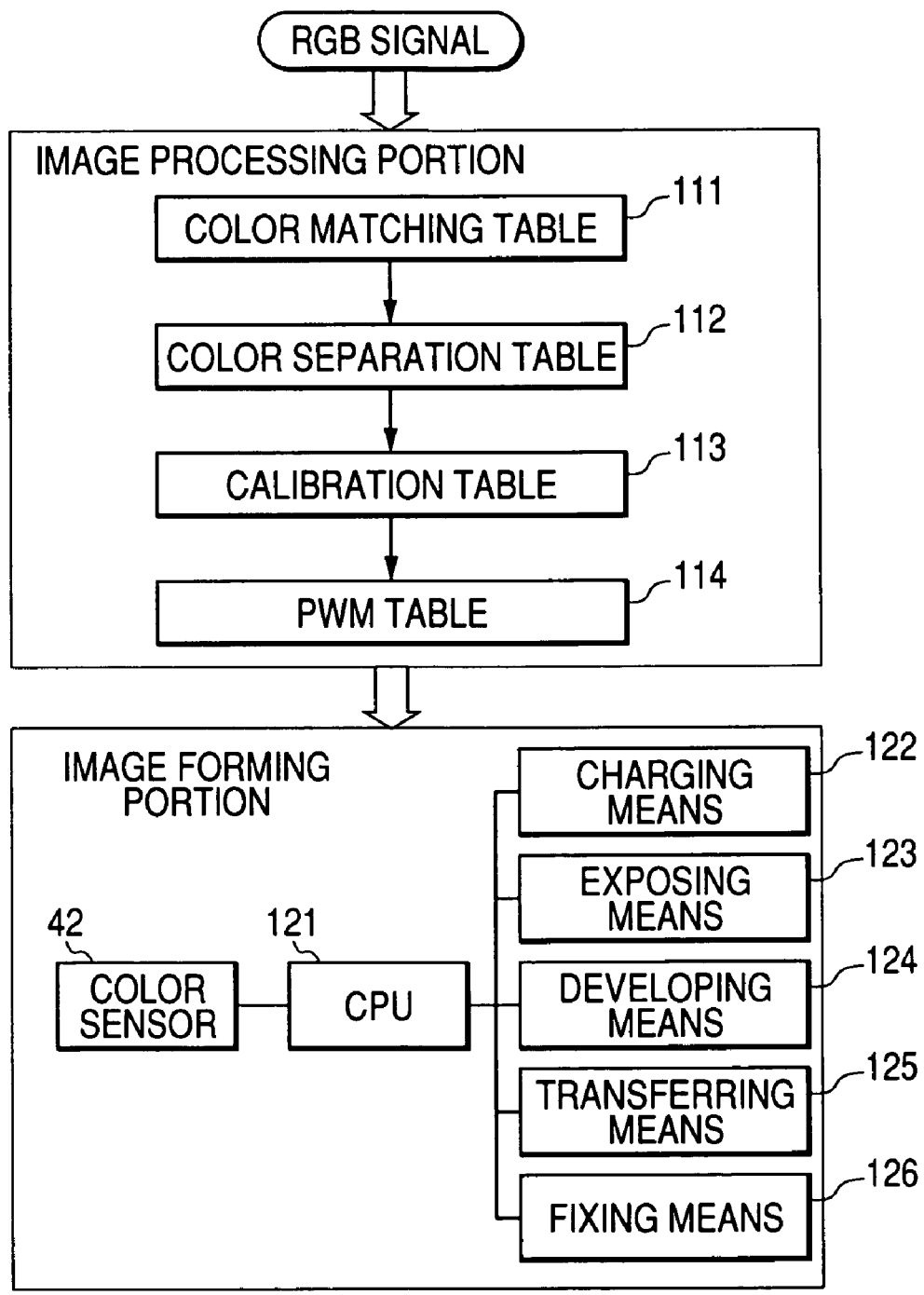
FIG. 2 is a diagram showing the overall configuration of a color image forming apparatus according to embodiment 1.

FIG. 2 is a diagram showing the overall configuration of an electrophotographic color image forming apparatus according to embodiment 1. This color image forming apparatus comprises an image processing portion and an image forming portion.

First, a process in the image processing portion will be described below. With a color matching table 111, the RGB signals representing the colors of an image sent from a personal computer are converted into device RGB signals (hereafter referred to as "DevRGB") in conformance with a color reproduction range of the color image forming apparatus. Then, the converted DevRGB signals are converted into the CMYK signals indicating the colors of toner color materials for the color image forming apparatus, using a color separation table 112. A calibration table 113 is a table for correcting the density-gradation characteristics intrinsic to the color image forming apparatus and employed to convert the CMYK signals into the C'M'Y'K' signals in which the density-gradation characteristics are corrected. Moreover, with a PWM (Pulse Width Modulation) table 114, the C'M'Y'K' signals are converted into the exposure times Tc, Tm, Ty and Tk of corresponding scanner portions 24C, 24M, 24Y and 24K (see FIG. 3).

Next, the image forming portion will be described. Main means involved in the image formation include charging means 122, exposing means 123, developing means 124, transferring means 125 and fixing means 126, which are controlled by a CPU 121. Moreover, a color sensor 42 is connected to the CPU.

Figure 3:
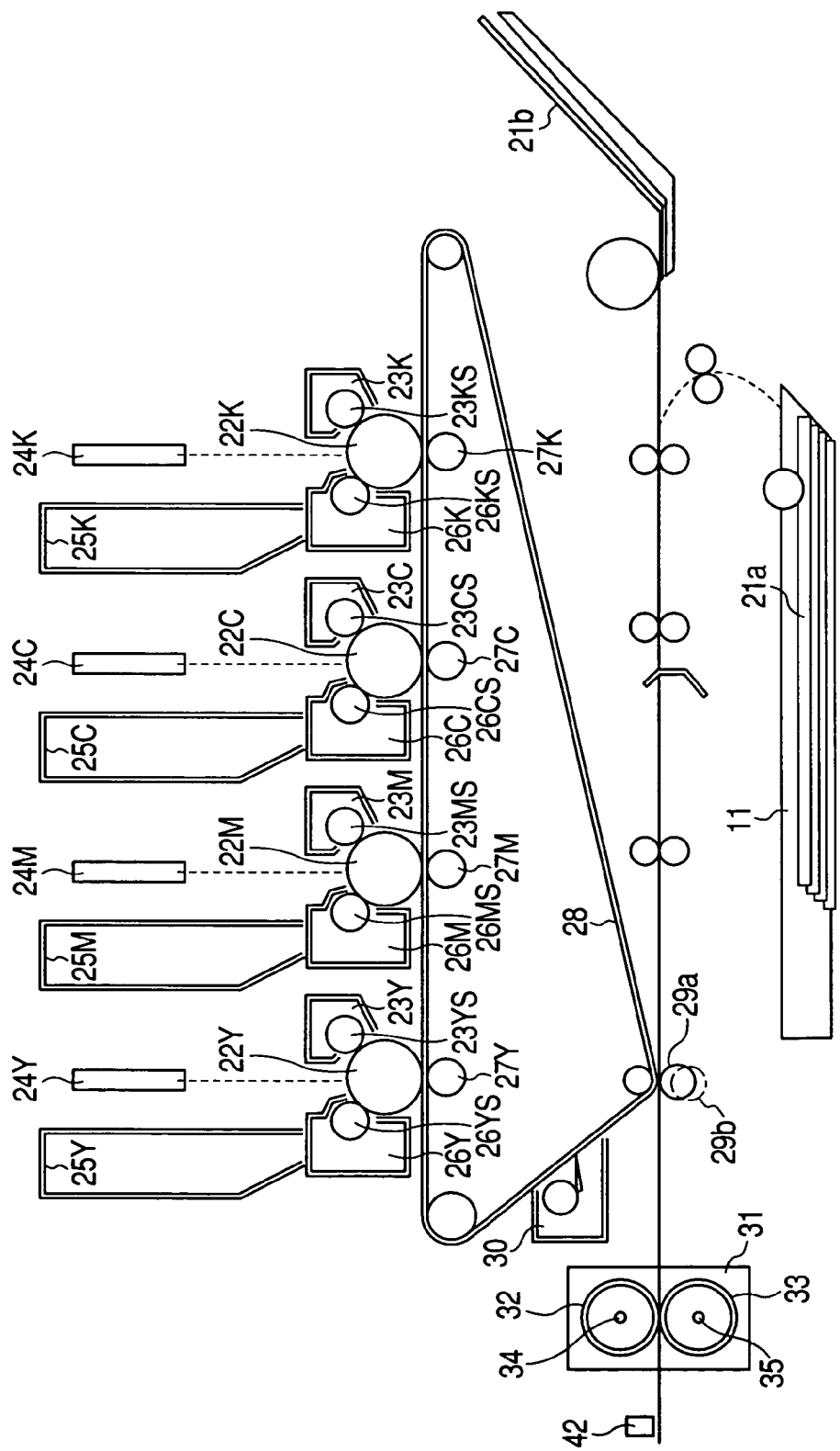
FIG. 3 is a view showing the electrophotographic color image forming apparatus in cross section according to embodiment 1.

FIG. 3 is a cross-sectional view of the color image forming apparatus. This apparatus is the color image forming apparatus of tandem type employing an intermediate transfer member 28, which is one example of the electrophotographic color image forming apparatus, as shown in FIG. 3. Referring to FIG. 3, the operation of the image forming portion in the electrophotographic color image forming apparatus will be described below.

The image forming portion forms an electrostatic latent image with exposing light applied based on an exposure time converted by the image processing portion, forming the monochromatic toner images by developing this electrostatic latent image, forming a multi-color toner image by superposing the monochromatic toner images, transferring this multi-color toner image onto a recording medium 11, and fixing the multi-color toner image on the recording medium.

The charging means 122 comprises four injection charge devices 23Y, 23M, 23C and 23K for charging the photosensitive members 22Y, 22M, 22C and 22K at the stations of yellow (Y), magenta (M), cyan (C) and black (K), the injection charge devices having respective sleeves 23YS, 23MS, 23CS and 23KS.

The photosensitive members 22Y, 22M, 22C and 22K have an organic photoconductive layer applied on the outer periphery of an aluminum cylinder, and are rotated by a driving force of a drive motor, not shown. The photosensitive members 22Y, 22M, 22C and 22K are rotated in a counterclockwise direction along with an image forming operation by the drive motor.

The exposing means 123 applies exposing light from the scanner portions 24Y, 24M, 24C and 24K onto the photosensitive members 22Y, 22M, 22C and 22K, selectively exposing the surfaces of the photosensitive members 22Y, 22M, 22C and 22K to form the electrostatic latent images.

The developing means 124 comprises four developing devices 26Y, 26M, 26C and 26K for developing the images of yellow (Y), magenta (M), cyan (C) and black (K) at respective stations to visualize the electrostatic latent images, in which the developing devices are provided with the sleeves 26YS, 26MS, 26CS and 26KS. Each developing device 26 can be detachably attached.

The transferring means 125 transfers the monochrome toner images, along with the rotation of the photosensitive members 22Y, 22M, 22C and 22K and the primary transfer rollers 27Y, 27M, 27C and 27K located oppositely, by rotating the intermediate transfer member 28 in a clockwise direction to transfer the monochrome toner images from the photosensitive members 22 to the intermediate transfer member 28. By applying an appropriate bias voltage to the primary transfer rollers 27 and giving a difference between the rotating speed of the photosensitive members 22 and the rotating speed of the intermediate transfer member 28, the monochrome toner images are transferred onto the intermediate transfer member 28 efficiently. This operation is called a primary transfer.

Moreover, the transferring means 125 superposes the monochrome toner images on the intermediate transfer member 28 at respective stations, conveys the superposed multi-color toner image up to a secondary transfer roller 29 along with the rotation of the intermediate transfer member 28, picks up and conveys a recording medium 11 from a sheet feeding tray 21 to the secondary transfer roller 29, and transfers the multi-color toner image on the intermediate transfer member 28 onto the recording medium 11. The toner image is electrostatically transferred by applying an appropriate bias voltage to the secondary transfer roller 29. This operation is called a secondary transfer. The secondary transfer roller 29 contacts the recording medium 11 at a position 29a, while transferring the multi-color toner image onto the recording medium 11, and is spaced to a position 29b after the printing process.

The fixing means 126 comprises a fixing roller 32 for heating the recording medium 11 and a pressure roller 33 for pressing the recording medium 11 onto the fixing roller 32 to fuse and fix the transferred multi-color toner image on the recording medium 11. The fixing roller 32 and the pressure roller 33 are hollow and internally comprise heaters 34 and 35, respectively. A fixing apparatus 31 conveys the recording medium 11 holding the multi-color toner image onto the fixing roller 32 and the pressure roller 33, and fixes the toner on the recording medium by applying heat and pressure.

The recording medium 11 after the fixing of the toner is then discharged to a sheet discharge tray, not shown, by a sheet discharge roller, not shown, whereby the image forming operation is ended.

Cleaning means 30 cleans the toner remaining on the intermediate transfer member 28, in which after the transfer of the multi-color toner image of four colors formed on the intermediate transfer member 28 onto the recording medium 11, waste toner is stored in a cleaner container.

A color sensor 42 is disposed downstream of the fixing apparatus 31 on a conveying path of the recording medium, opposed to an image forming face of the recording medium 11, detecting the color of a mixed color patch that, after fixing, is formed on the recording medium 11. This detection process is for the purpose of outputting the RGB values. Disposed inside the color image forming apparatus, the color sensor can automatically detect the color before the sheet with image fixed is discharged to a sheet discharging portion.

Figure 4:
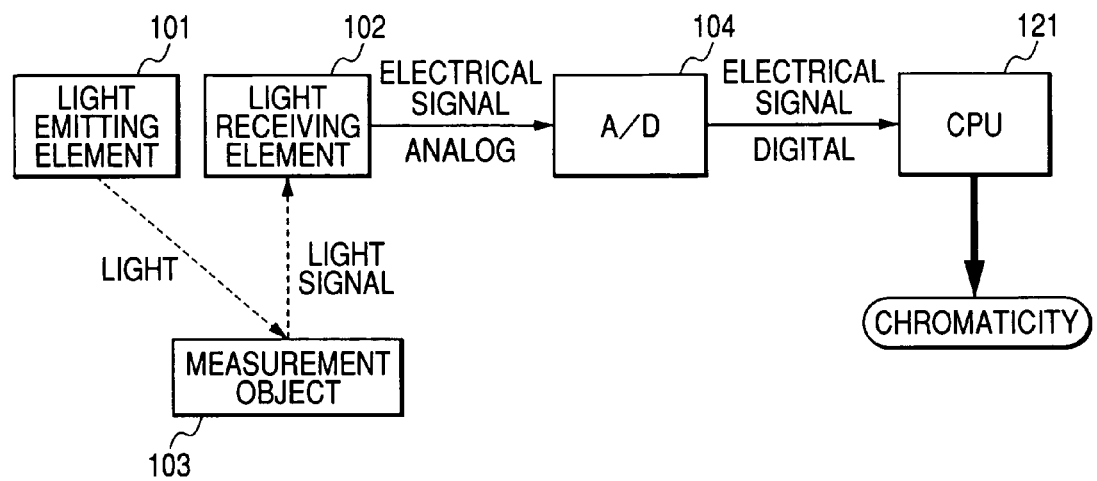
FIG. 4 is a block diagram showing the configuration of a color sensor and its peripheral devices according to embodiment 1.

FIG. 4 is a block diagram showing the configuration of the color sensor 42 and its peripheral devices. The color sensor and its peripheral devices are a light emitting element 101, a light receiving element 102, an A/D converter 104 and a CPU 121. The light emitting element 101 is a light source of the color sensor that emits light to a measurement object 103. Then, irregular light is reflected, as the reflection factor depends on a body color of the measurement object. The irregular reflected light enters the light receiving element 102 that converts light into an electric signal. Moreover, an analog electric signal is converted into a digital electric signal by the A/D converter 104. And the digital electric signal is taken into the CPU 121, and the XYZ chromaticity values are outputted through a linear conversion process as shown in formula (1).

Figure 5:
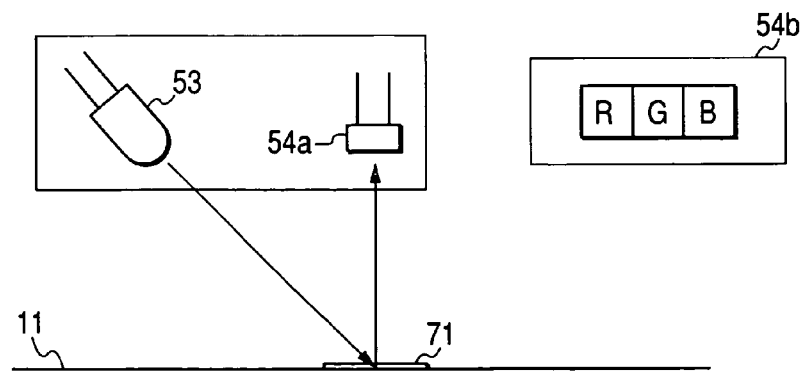
FIG. 5 is a view showing the color sensor in cross section according to embodiment 1.

FIG. 5 is a cross-sectional view of the color sensor 42. The color sensor 42 employs a white color LED 53 as the light emitting element 101 and a charge storage type sensor 54a with on-chip filters for three or more colors, such as RGB, as the light receiving element 102. Light from the white color LED 53 is made incident obliquely at an angle of 45° upon the recording medium 11 on which is formed the patch after fixing, and the intensity of irregular reflected light in a direction of 0° is detected by the charge storage type sensor 54a with the RGB on-chip filters. A light receiving portion of the charge storage type sensor 54a with RGB on-chip filters has independent pixels of RGB like 54b. The light receiving element 102 may be a photodiode. A set of three pixels of RGB may be arranged multiply. Also, instead of the mentioned arrangement, the angle of incidence may be 0° and the angle of reflection may be 45°. Moreover, an LED for emitting light of three or more colors such as RGB and a sensor without filter may be combined.

Figure 6:
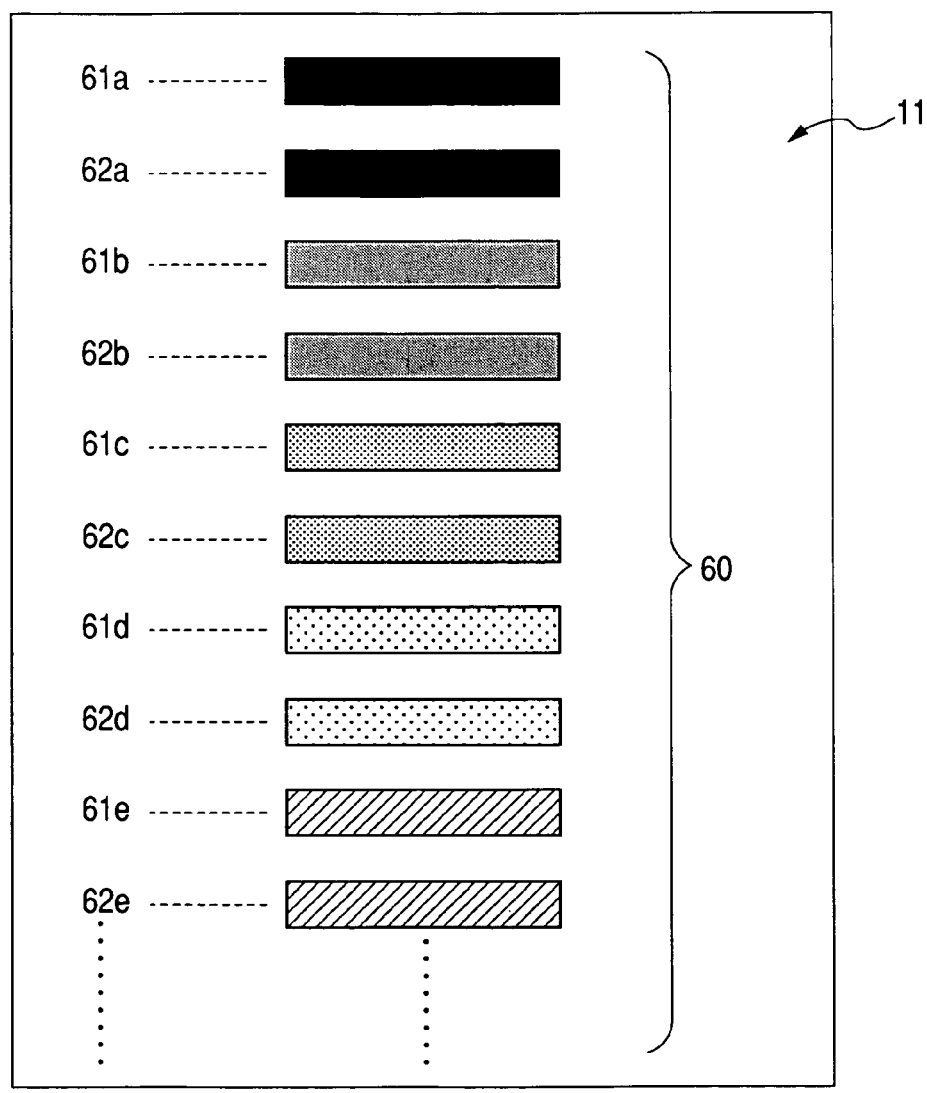
FIG. 6 is a diagram showing one example of the test chart in embodiment 1.

FIG. 6 is a diagram showing one example of a test chart detected by the color sensor 42. A color stabilization control test chart 60 is a gradation patch pattern of gray that is the most important color in making the color balance, and composed of a gray gradation patch 61 of only black (K) and a process gray gradation patch 62 in which yellow (Y), magenta (M) and cyan (C) are mixed. The gray gradation patch 61 of only black (K) and the process gray gradation patch 62, which have the same chromaticity in the image processing portion of the image forming apparatus, are paired, such as 61a and 62a, 61b and 62b, 61c and 62c. The chromaticity of this patch is detected by the color sensor 42, and is fed back to a calibration table so that there may be no color difference between the gray gradation patch 61 of only black (K) and the process gray gradation patch 62 which are paired.

To convert the RGB outputs of the sensor into the XYZ chromaticity values, the following formula (1) is employed:

$$\begin{pmatrix} X \\ Y \\ Z \end{pmatrix} = A \cdot \begin{pmatrix} r \\ g \\ b \end{pmatrix} = \begin{pmatrix} a_{11} & a_{12} & a_{13} \\ a_{21} & a_{22} & a_{23} \\ a_{31} & a_{32} & a_{33} \end{pmatrix} \cdot \begin{pmatrix} r \\ g \\ b \end{pmatrix} \quad (1)$$

where XYZ are XYZ chromaticity values calculated by converting the RGB outputs of the sensor, r, g and b are sensor outputs, A is a conversion matrix, and a is a matrix element.

In the following, a color conversion method for reducing the differences between the XYZ chromaticity values obtained by converting the RGB outputs of the sensor in this embodiment and the XYZ chromaticity values obtained from the spectral reflectance as defined by the International Commission on Illumination is given.

This method involves changing the matrix A in formula (1) for every attribute of patch. A gray gradation patch matrix A1 of only black (K) and a process gray gradation patch matrix A2 are set up. The matrices A1 and A2 are optimized to convert the RGB outputs of the sensor detecting the patch of each attribute into the XYZ chromaticity values.

Figure 1:
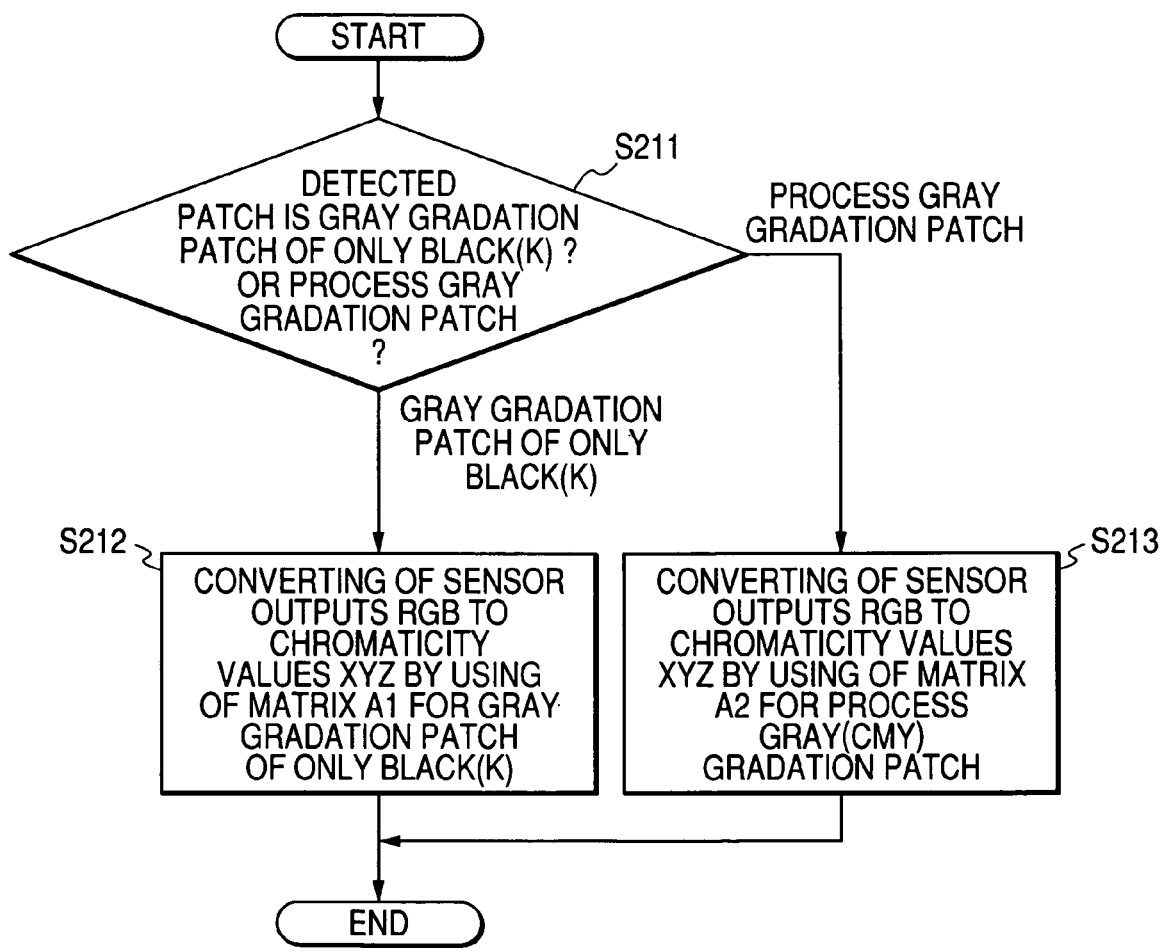
FIG. 1 is a flowchart for converting the RGB outputs into XYZ chromaticity values according to an embodiment 1.

FIG. 1 is a flowchart for converting the RGB outputs of the sensor into the XYZ chromaticity values.

In step 211, it is determined whether or not the detected patch is gray gradation patch 61 of only black (K) or process gray gradation patch 62. Since the patch format of the color stabilization control test chart 60 is fixed in the image forming apparatus, the determination may be made in the sequence of detecting the patch.

If it is determined in step 211 that the detected patch is a gray gradation patch 61 of only black (K) because the patch is detected at an odd number in the color stabilization control test chart 60, the RGB outputs of the sensor are converted into the XYZ chromaticity values, using the gray gradation patch matrix A1 of only black (K), in accordance with formula (1), in step 212.

If it is determined in step 211 that the detected patch is the process gray gradation patch 62, because the patch is detected at an even number in the color stabilization control test chart 60, the RGB outputs of the sensor are converted into the XYZ chromaticity values, using the process gray gradation patch matrix A2, in accordance with formula (1), in step 213.

Next, the experimental results are shown below in which the differences between the XYZ chromaticity values obtained by converting the RGB outputs of the sensor and the XYZ chromaticity values obtained from the spectral reflectance as defined by the International Commission on Illumination could be reduced by changing the matrix A in formula (1) for every attribute of patch.

In the experiment, because the relations between the spectral sensitivity of the RGB outputs of the color sensor and the XYZ chromaticity values as defined by the International Commission on Illumination are not completely linear, formula (2) using the RGB outputs of the sensor up to the third order is employed, instead of formula (1), to decrease the influence of not completely linear relations as much as possible:

$$\begin{pmatrix} X \\ Y \\ Z \end{pmatrix} = \quad (2)$$

$$A \cdot \begin{pmatrix} r \\ g \\ b \\ r^2 \\ g^2 \\ b^2 \\ r^3 \\ g^3 \\ b^3 \end{pmatrix} = \begin{pmatrix} a_{11} & a_{12} & a_{13} & a_{14} & a_{15} & a_{16} & a_{17} & a_{18} & a_{19} \\ a_{21} & a_{22} & a_{23} & a_{24} & a_{25} & a_{26} & a_{27} & a_{28} & a_{29} \\ a_{31} & a_{32} & a_{33} & a_{34} & a_{35} & a_{36} & a_{37} & a_{38} & a_{39} \end{pmatrix} \cdot \begin{pmatrix} r \\ g \\ b \\ r^2 \\ g^2 \\ b^2 \\ r^3 \\ g^3 \\ b^3 \end{pmatrix}$$

The number of measured patches is about 250 for the gray gradation patch of only black, and about 500 for the process gray gradation patch. The results are shown in Table 1:

TABLE 1

| ΔE(Ave.) | Gray gradation patch of only black | Process gray gradation patch |
|---|---|---|
| Matrix A is changed for every attribute of patch | 0.53 | 0.99 |
| Matrix A is common for all patches | 3.90 | 1.53 |

The numerical values as listed in the table are average values of chromaticity value differences occurring between the XYZ chromaticity values obtained by converting the RGB outputs of the sensor and the XYZ chromaticity values obtained from the spectral reflectance as defined by the International Commission on Illumination. Both the XYZ values are converted into L*a*b* as defined by the International Commission on Illumination and then calculated as the color difference (ΔE).

The above results reveal that the method for changing the matrix A for every attribute of patch that is the kind of color material for use, whether the measured patch is gray gradation patch of only black or process gray gradation patch, can make smaller the color difference (ΔE) occurring between the XYZ chromaticity values obtained by converting the RGB outputs of the sensor and the XYZ chromaticity values obtained from the spectral reflectance as defined by the International Commission on Illumination. This is because the non-linearity of the color matching functions for the spectral sensitivity of the RGB outputs of the color sensor and the XYZ chromaticity values as defined by the International Commission on Illumination is reduced in the extent of influence by changing the matrix A for every attribute of patch.

Accordingly, it is possible to reduce the color differences between the XYZ chromaticity values obtained by converting the RGB outputs of the sensor and the XYZ chromaticity values obtained from the spectral reflectance as defined by the International Commission on Illumination by employing the color conversion method for changing the matrix A for every attribute of patch.

This method is based on the premise that the attribute of a patch can be determined when detecting the patch. In an image forming apparatus having a color sensor, as described, because the patch is detected in the sequence of forming the image, the attribute of patch detected by the color sensor can be judged, and thus this method is applicable.

Though the RGB outputs of the sensor are converted into the XYZ chromaticity values here, it is apparent that the method as described in connection with this embodiment is effective when the color matching function in two different color specifications systems has non-linearity.

Moreover, there are two attributes here, including the gray gradation patch of only black (K) and the process gray gradation patch in which yellow (Y), magenta (M) and cyan (C) are mixed, but the classification method for attributes is not limited to the combination of color materials as indicated here.

Moreover, the methods for converting the RGB outputs of the sensor into XYZ chromaticity values include a linear conversion method by matrix, a neural network method and a method using a look-up table. In any method, if the attribute of the patch is judged, it is possible to reduce the differences between the XYZ chromaticity values obtained by converting the RGB outputs of the sensor and the XYZ chromaticity values obtained from the spectral reflectance as defined by the International Commission on Illumination, by changing the weight of connection between neurons for use in the neural network for every attribute of patch, or by changing the contents of the look-up table.

As described above, by changing various parameters for use in converting the RGB outputs of the sensor into the XYZ chromaticity values for every attribute of patch, it is possible to reduce the differences between the XYZ chromaticity values obtained by converting the RGB outputs of the sensor and the XYZ chromaticity values obtained from the spectral reflectance as defined by the International Commission on Illumination, whereby the precision of color stabilization control using the XYZ chromaticity values can be improved.

Embodiment 2

In embodiment 2, an image forming apparatus not having a color sensor like color sensor 42 above implements color stabilization control equivalent to that described in embodiment 1, employing an external image reading apparatus, instead of color sensor 42, and using a color conversion method that reduces the differences between the XYZ chromaticity values obtained by converting the RGB outputs of the external image reading apparatus and the XYZ chromaticity values obtained from the spectral reflectance as defined by the International Commission on Illumination.

Figure 7:
FIG. 7 is a diagram (1) showing a connection method between color image forming apparatus and color image reading apparatus according to an embodiment 2.
Figure 8:
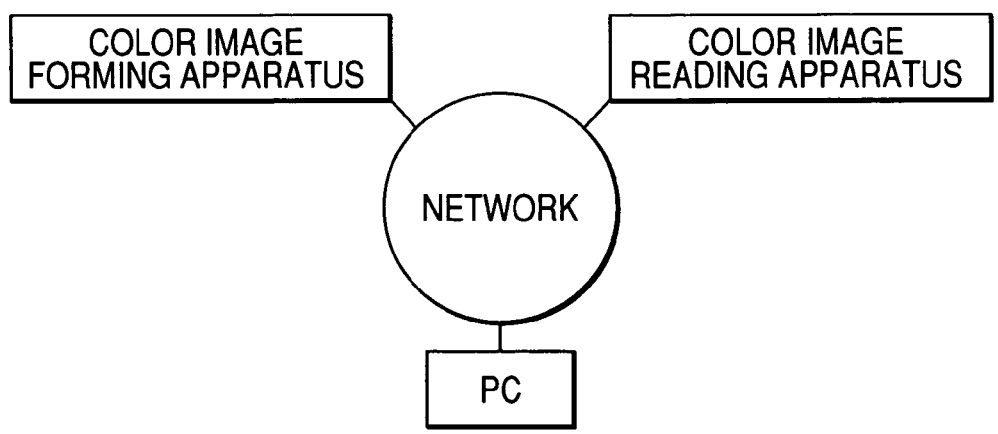
FIG. 8 is a diagram (2) showing a connection method between color image forming apparatus and color image reading apparatus according to embodiment 2.

FIG. 7 and FIG. 8 are diagrams showing a connection method between color image forming apparatus and color image reading apparatus. In FIG. 7, the color image forming apparatus and color image reading apparatus are directly connected, but in FIG. 8, they are connected via a network. The color image reading apparatus, like the color sensor, mounts a white color source and a sensor with the filters of three or more colors such as RGB, or light sources of three or more colors such as RGB and a sensor having sensitivity in the visible region, and outputs the RGB sensor signals.

Figure 9:
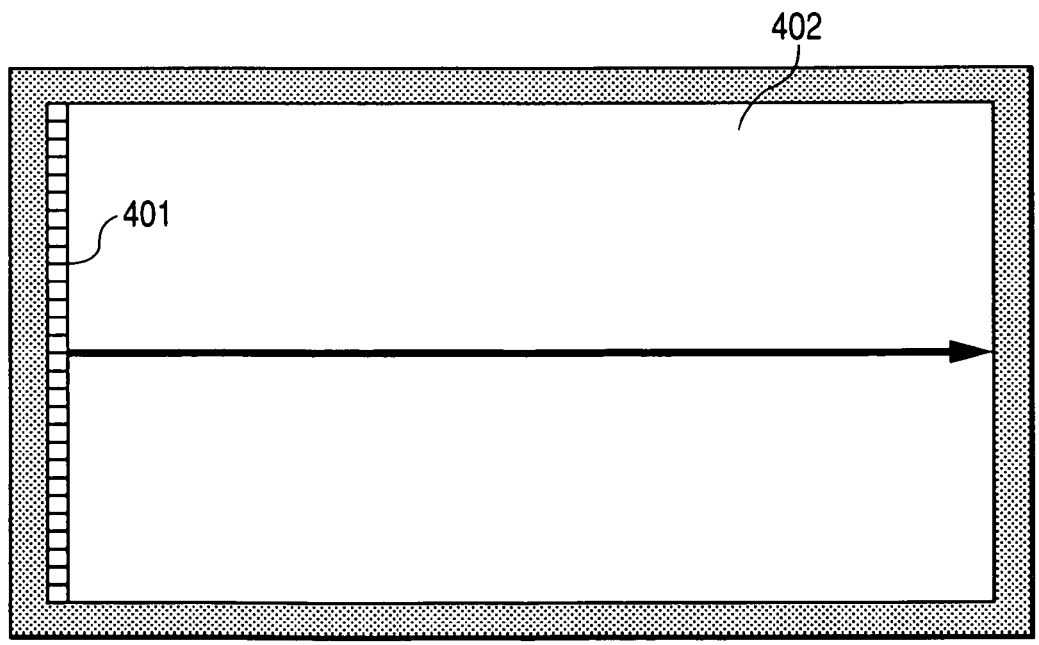
FIG. 9 is a view showing one example of a color image reading apparatus according to embodiment 2.

FIG. 9 is a view showing a flat bed image scanner as seen from above as one example of the color image reading apparatus. The of this apparatus operation will be described below. The user of the image reading apparatus sets a medium formed with the image on a platen 402. Once the medium is set, the sensor 401 is moved in a direction as indicated by the arrow. The sensor proceeds in step operation, and reads the image one line at each step. By integrating these images of one line each, the entire image formed on one medium can be read.

In this embodiment, a monochrome gradation patch of cyan (C), magenta (M), yellow (Y) and black (K) or a patch in which CMY are mixed is formed on the recording medium, and the outputted recording medium formed with the patch is set on the color image reading apparatus to detect the chromaticity of the patch. By feeding back the detection result to the calibration table for correcting the exposure amount, process conditions and the color gradation characteristics of the image forming portion, the color stabilization control of the final output image equivalent to that described in connection with embodiment 1 can be achieved.

Figure 10:
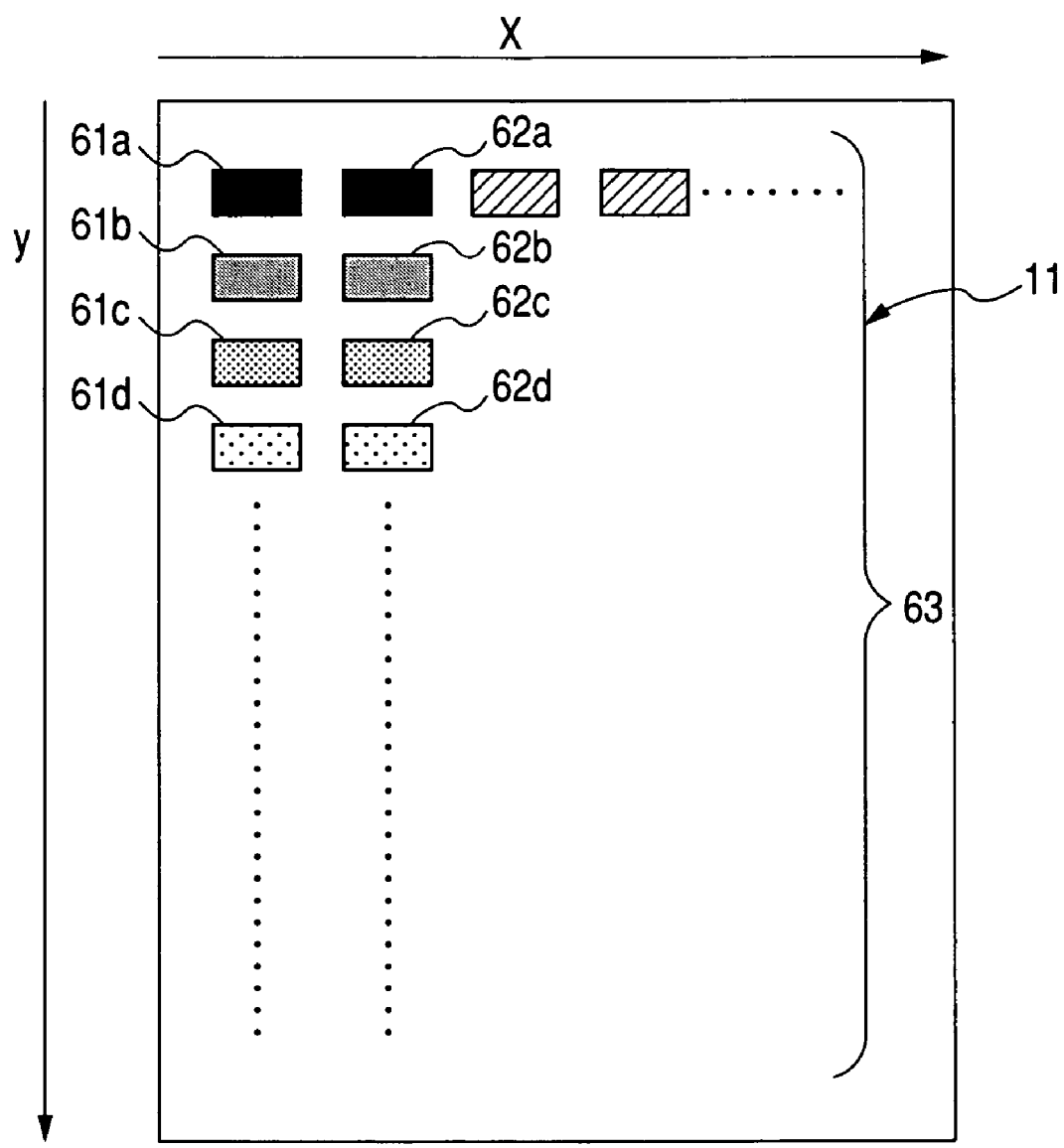
FIG. 10 is a view showing one example of the test chart according to embodiment 2.

FIG. 10 is a view showing one example of the test chart detected by the color image reading apparatus. A color stabilization control test chart 63 is a gradation patch pattern of gray, which is the most important color in making the color balance, and is composed of a gray gradation patch of only black (K) 61 and a process gray gradation patch 62 in which yellow (Y), magenta (M) and cyan (C) are mixed. The gray gradation patch 61 of only black (K) and the process gray gradation patch 62, which have the same chromaticity in the image processing portion of the image forming apparatus, are paired, such as 61*a* and 62*a*, 61*b* and 62*b*, 61*c* and 62*c*. A different point from the color sensor test chart as shown in FIG. 6 in embodiment 1 is that the patches 61, 62 are arranged over the entire face of the recording medium 1, since the color image reading apparatus can read the images on the overall face of the recording medium at one time.

In this embodiment, the color conversion method for reducing the differences between the XYZ chromaticity values obtained by converting the RGB outputs of the sensor and the XYZ chromaticity values obtained from the spectral reflectance as defined by the International Commission on Illumination is identical to the method shown in FIG. 1 in embodiment 1. In step 211 in FIG. 1, it is determined whether the detected patch is a gray gradation patch of only black (K) like patch 61 or a process gray gradation patch like patch 62.

The image reading apparatus can selectively detect the gray gradation patch of only black (K) 61 or process gray gradation patch 62 using patch position coordinate information of the color stabilization control test chart 63. The image reading apparatus is connected to the image forming apparatus, and notifies the image reading apparatus of the patch position coordinate information of the color stabilization control test chart 63. In this way the determination in step 211 in FIG. 1 is made.

Though the RGB outputs of the sensor are converted into XYZ chromaticity values here, it is apparent that the method described in this embodiment is effective also in other situations where the color matching function in two different color specifications systems is non-linear.

Moreover, there are two attributes here, including the gray gradation patch of only black (K) and the process gray gradation patch in which yellow (Y), magenta (M) and cyan (C) are mixed, but the classification method for attributes is not limited to this combination of color materials.

Moreover, the methods for converting the RGB outputs of the sensor into XYZ chromaticity values include a linear conversion method using a matrix, a neural network method and a method using a look-up table. In any method, if the attribute of the patch is judged, it is possible to reduce the differences between the XYZ chromaticity values obtained by converting the RGB outputs of the sensor and the XYZ chromaticity values obtained from the spectral reflectance as defined by the International Commission on Illumination by changing the weight of connection between neurons for use in the neural network for every attribute of patch, or by changing the look-up table that is used.

As described above, the color image forming apparatus having no color sensor is connected to the color image reading apparatus, and by changing various parameters for use in converting the RGB outputs of the color image reading apparatus into XYZ chromaticity values for every attribute of patch, it is possible to reduce the differences between the XYZ chromaticity values obtained by converting the RGB outputs of the color reading apparatus and the XYZ chromaticity values obtained from the spectral reflectance as defined by the International Commission on Illumination, whereby the precision of color stabilization control using the XYZ chromaticity values can be improved.

Embodiment 3

In embodiment 3, the method for changing the matrix for use in converting the RGB outputs into XYZ chromaticity values as described in embodiments 1 and 2 is shown, in which the matrix is changed depending on the attribute of the patch, i.e., whether the patch is a gray gradation patch of only black (K) or a process gray gradation patch, and by detecting the substratum color of patch, namely, the color of the recording medium, to judge the color area. Thereby, it is possible further to reduce the differences between the XYZ chromaticity values obtained by converting the RGB outputs and the XYZ chromaticity values obtained from the spectral reflectance as defined by the International Commission on Illumination.

Figure 11:
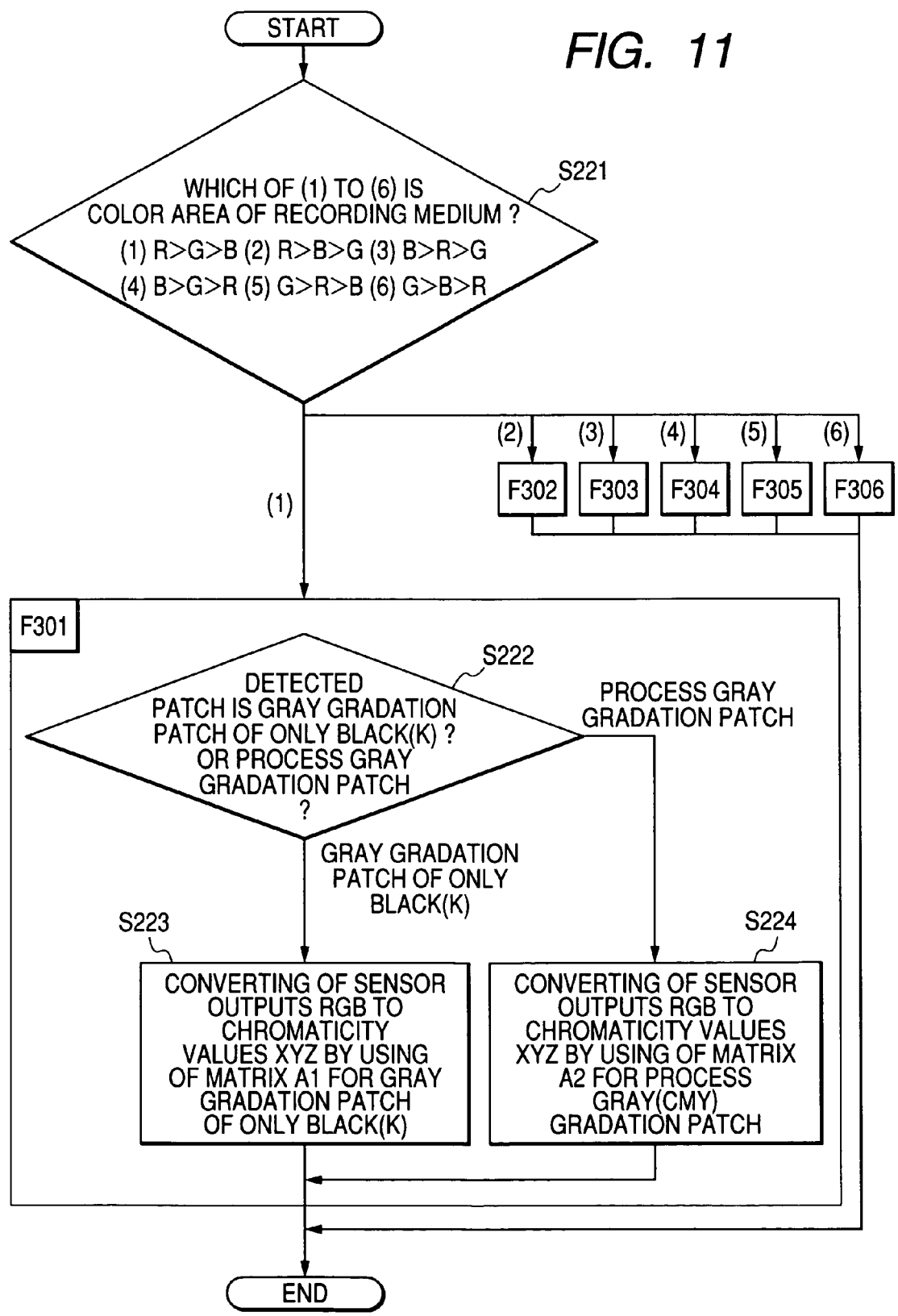
FIG. 11 is a flowchart for converting the RGB outputs to XYZ chromaticity values according to an embodiment 3.

FIG. 11 is a flowchart for converting the RGB outputs into XYZ chromaticity values in embodiment 3.

In step 221, the recording medium 11 in an area where the patch is not formed as the substratum color of patch is detected, and it is judged into which of (1) to (6) the sizes of the RGB outputs are classified: (1) R>G>B, (2) R>B>G, (3) B>R>G, (4) B>G>R, (5) G>R>B and (6) G>B>R.

Since the following steps are common except that the matrix A is different in each of (1) to (6), the flow F301 for the classification of (1) will be described below.

In step 222, it is determined whether the detected patch is a gray gradation patch of only black (K) like patch 61 or a process gray gradation patch like patch 62. The patch format of color stabilization control test charts 60, 63 is fixed in the image forming apparatus, whereby the determination is made based on the sequence or position of detecting the patch.

If it is determined in step 222 that the detected patch is a gray gradation patch of only black (K) like patch 61, the RGB outputs of the sensor are converted into XYZ chromaticity values in accordance with formula (1), employing matrix A1 for gray gradation patch of only black (K) in step 223.

If it is determined in step 222 that the detected patch is a process gray gradation patch like patch 62, the RGB outputs of the sensor are converted into XYZ chromaticity values in accordance with formula (1), employing matrix A2 for process gray gradation patch in step 224.

If it is determined that the color area is classified into any one of (2) to (6) in step 221, the procedure goes respectively tone of flows F302 to F306. In F302, the matrix for gray gradation patch of only black (K) is A3, and the matrix for process gray gradation patch is A4, these matrixes differing from A1 and A2 in F301, and the others being the same. Likewise, in F303, the matrix for gray gradation patch of only black (K) is A5, and the matrix for process gray gradation patch is A6, in F304, the matrix for gray gradation patch of only black (K) is A7, and the matrix for process gray gradation patch is A8, in F305, the matrix for gray gradation patch of only black (K) is A9, and the matrix for process gray gradation patch is A10, and in F306, the matrix for gray gradation patch of only black (K) is A11, and the matrix for process gray gradation patch is A12.

The color of patch formed on the recording medium 11 is affected by the substratum color of patch, namely, the color of the recording medium 11, without regard to the color material used for the gray gradation patch of only black (K) or process gray gradation patch. For example, if the recording medium is red, the color of patch formed on a red recording medium is redder than the color of the same patch formed on a white recording medium. That is, even when the color image forming apparatus forms the same patch, the spectral reflectance of the patch may differ according to the color of the recording medium on which the patch is formed. Accordingly, it is possible further to reduce the differences between the XYZ chromaticity values obtained by converting the RGB outputs and the XYZ chromaticity values obtained from the spectral reflectance as defined by the International Commission on Illumination by changing the matrix A that is used, depending on the color area of the recording medium 11.

Also, the color areas of substratum color of patch are classified into six attributes, but the classification method for attributes is not limited to the method shown herein.

Through the RGB outputs of the sensor are converted into the XYZ chromaticity values, it is apparent that the method described in this embodiment is effective in other situations where the color matching function in two different color specification systems is non-linear.

Moreover, there are two attributes here, including the gray gradation patch of only black (K) and the process gray gradation patch in which yellow (Y), magenta (M) and cyan (C) are mixed, but the classification method for attributes is not limited to this combination of color materials.

Moreover, the methods for converting the RGB outputs of the sensor into XYZ chromaticity values include a linear conversion method by means of a matrix, a neural network method and a method using a look-up table. In any method, if the color area of the recording medium and the attribute of the patch are judged, it is possible to reduce the differences between the XYZ chromaticity values obtained by converting the RGB outputs of the sensor and the XYZ chromaticity values obtained from the spectral reflectance as defined by the International Commission on Illumination by changing the weight of connection between neurons for use in the neural network for every color area of the recording medium and every attribute of patch, or using the look-up table.

As described above, by changing various parameters for use in converting the RGB outputs of the sensor into the XYZ chromaticity values according to the combination of the attribute of patch and the color area of the recording medium, it is possible further to reduce the difference between the XYZ chromaticity values obtained by converting the RGB outputs of the sensor and the XYZ chromaticity values obtained from the spectral reflectance as defined by the International Commission on Illumination, whereby the precision of color stabilization control using the XYZ chromaticity values can be improved.

While the invention has been described in terms of its preferred embodiments, various modifications may be made thereto without departing from the spirit and scope of the invention as defined by the appended claims.

This application claims priority from Japanese Patent Application No. 2004-219971, filed Jul. 28, 2004, which is hereby incorporated by reference herein.

What is claimed is:

1. A color image forming apparatus comprising:
a sheet discharging portion to which a recording medium is discharged after an image formation;
a detecting portion disposed on a recording medium conveying path to detect, before the recording medium is discharged to the sheet discharging portion, colors of patches after fixation, the patches having been formed and fixed on the recording medium;
an exposure portion, which performs an exposure based on an image inputted from an external computer;
a converting portion that converts a color signal, obtained by the detecting portion and corresponding to a detection signal in a first color specification system, into a color signal corresponding to a conversion result in a second color specification system as color signal conversion processes, wherein the first color specification system is a RGB color system and the second color specification system is a XYZ color system; and
an adjusting portion that adjusts an image forming condition for the color image forming apparatus, based on the color signal of the second color specification system, corresponding to the conversion result, obtained by the converting portion,
wherein the converting portion uses a parameter depending on an attribute of each of the patches to be subject to color measurement to perform the color signal conversion processes for the respective patches, the parameter being coefficients for the color signal conversion from the first color specification system to the second color specification system,
wherein the color signal conversion processes comprise:
selecting a matrix used in converting the color signal, as the detection signal, in the first color specification system into the color signal, as the conversion result, in the second color specification system; or
changing a weight of connection between neurons in a neural network used in converting the color signal, as the detection signal, in the first color specification system into the color signal, as the conversion result, in the second color specification system; or
changing a look-up table used in converting the color signal, as the detection signal, in the first color specification system into the color signal, as the conversion result, in the second color specification system, and
wherein the patches are formed in a row on the recording medium and the attributes of the patches are determined by detection orders of the patches, formed in the row, for detection by the detecting portion.

2. A color image forming apparatus according to claim 1, wherein the attributes of the patches are classified by color materials used in forming the patches on the recording medium.

3. A color image forming apparatus according to claim 1, wherein the patches include a monochromatic patch formed with only black and a color mixture patch formed by mixing yellow, magenta, and cyan, and
wherein the converting portion selects between a matrix for the monochromatic patch for performing a color signal conversion and a matrix for the mixture patch for performing the color signal conversion based on the detection orders of the patches, formed in the row, for detection by the detecting portion, and
wherein the converting portion performs the color signal conversion by using a selected matrix.

4. A color image forming apparatus according to claim 1, wherein the detecting portion detects colors of the patches formed and fixed on the recording medium, and a color of an area, on which the patches are not formed, of the recording medium on which the patches are formed and fixed, and the converting portion performs the color signal conversion processes based on the detection signal of the area of the recording medium by the detecting portion and the detection orders of the patches, formed in the row, for detection by the detecting portion.

5. A color image forming apparatus according to claim 4, wherein the converting portion performs the color signal conversion processes based on a size comparison among RGB signals of the color signal of the area of the recording medium by the detecting portion and the detection orders of the patches, formed in the row, for detection by the detecting portion.

6. A color image forming apparatus according to claim 1, wherein the parameter is a matrix.

* * * * *